United States Patent
Hopkins et al.

(10) Patent No.: US 6,206,203 B1
(45) Date of Patent: Mar. 27, 2001

(54) APPARATUS AND PROCESS FOR SEPARATING COMPONENTS OF A TREATMENT MIXTURE FROM WASTE WATER TREATMENT SYSTEM

(75) Inventors: Matthew B. Hopkins, Kennesaw, GA (US); William D. Shermer, Ballwin; Jeff R. Herbst, St. Louis, both of MO (US); Robert J. DeRosa, Marietta, GA (US)

(73) Assignee: Novus International, Inc., St. Louis, MO (US)

( * ) Notice: Subject to any disclaimer, the term of this patent is extended or adjusted under 35 U.S.C. 154(b) by 0 days.

(21) Appl. No.: 09/121,416

(22) Filed: Jul. 23, 1998

Related U.S. Application Data

(63) Continuation-in-part of application No. 08/787,792, filed on Jan. 23, 1997, now Pat. No. 5,980,754, which is a continuation-in-part of application No. 09/599,479, filed on Jan. 23, 1996, now Pat. No. 5,658,462.

(51) Int. Cl.$^7$ .......................... B01D 33/056; B01D 33/04
(52) U.S. Cl. ........................ 210/400; 210/205; 210/456
(58) Field of Search .................... 210/400, 401, 210/456, 205, 206; 100/118

(56) References Cited

U.S. PATENT DOCUMENTS

| 965,486 | * | 7/1910 | Putt . |
| 3,138,088 | * | 6/1964 | Foth . |
| 3,899,419 | | 8/1975 | Emanuel . |
| 3,940,334 | | 2/1976 | Miyazawa . |
| 4,022,691 | * | 5/1977 | Heinrich . |
| 4,081,375 | | 3/1978 | Deal et al. . |
| 4,115,275 | * | 9/1978 | Morris . |

(List continued on next page.)

FOREIGN PATENT DOCUMENTS

| 497237 | 5/1930 | (DE) . |
| 2212206 | 11/1972 | (DE) . |
| 2811820 | 9/1978 | (DE) . |

(List continued on next page.)

OTHER PUBLICATIONS

Lau, Paul L., "Drying of Alum Sludge Using the Carver–Greenfield Process", Contra Costa Water District, Concord, California, publication date unknown.

"The Carver–Greenfield Process; Dehydro–Tech Corporation; Application Analysis Report", U.S. Environmental Protection Agency; EPA Document No. EPA/540/AR–92/002, Aug. 1992.

"Polyhance AE 1706", Product Information Sheet from WaCon Incorporated of Atlanta, Georgia, publication date unknown, but believed to be prior to May 10, 1989.

(List continued on next page.)

Primary Examiner—Thomas M. Lithgow
(74) Attorney, Agent, or Firm—Senniger, Powers, Leavitt & Roedel

(57) ABSTRACT

Apparatus and process for separating components of a treatment mixture from a waste treatment system comprises feeding the treatment mixture to an endless filtering belt. The filtering belt has a mesh size selected to permit liquid components of the mixture to filter down through the belt while retaining particulate components thereon. The belt is moved by a drive system generally in a circuit between upstream and downstream ends of the apparatus as liquid components are separated from the mixture by filtering through the filtering belt. Unfiltered mixture is passed beneath a press disposed in opposed relation with the belt generally between the upstream and downstream ends of the apparatus. The press is capable of applying a squeezing pressure against the mixture to squeeze the mixture between the press and the filtering belt to separate water and liquified fatty components from the mixture for filtering through the belt. The press is adapted for movement toward and away from the filtering belt to allow the mixture to pass downstream of the press substantially without particulate components of the mixture being mashed into and entrained in the filtering belt by the squeezing pressure of the press.

16 Claims, 6 Drawing Sheets

U.S. PATENT DOCUMENTS

| | | |
|---|---|---|
| 4,137,167 | 1/1979 | Kenyon et al. . |
| 4,140,636 | 2/1979 | Nakashima . |
| 4,142,971 * | 3/1979 | Le Fur et al. . |
| 4,151,093 | 4/1979 | Krofta . |
| 4,232,051 | 11/1980 | Hinds, Jr. et al. . |
| 4,338,337 | 7/1982 | Frankl . |
| 4,354,934 | 10/1982 | Kohonen . |
| 4,361,590 | 11/1982 | Wojcik . |
| 4,377,479 | 3/1983 | Pierson . |
| 4,475,453 | 10/1984 | Davis . |
| 4,551,255 | 11/1985 | MIller . |
| 4,567,050 * | 1/1986 | Roth . |
| 4,686,930 | 8/1987 | Ritz . |
| 4,756,092 | 7/1988 | Anderson et al. . |
| 4,787,972 | 11/1988 | Stubblebine . |
| 4,810,257 | 3/1989 | Lau et al. . |
| 4,812,234 | 3/1989 | Perchthaler et al. . |
| 4,842,749 | 6/1989 | Cox . |
| 4,951,805 * | 8/1990 | Gordon et al. . |
| 4,961,858 | 10/1990 | Spei et al. . |
| 4,966,733 | 10/1990 | Fernando et al. . |
| 4,981,599 | 1/1991 | Stewart, Jr. . |
| 5,030,359 | 7/1991 | Castrantas et al. . |
| 5,053,140 | 10/1991 | Hurst . |
| 5,074,199 | 12/1991 | Miller . |
| 5,133,879 | 7/1992 | Tittanen . |
| 5,173,190 | 12/1992 | Picek . |
| 5,174,903 | 12/1992 | Miller . |
| 5,186,817 | 2/1993 | Paspek et al. . |
| 5,253,567 | 10/1993 | Gunawardena . |
| 5,286,386 | 2/1994 | Darian et al. . |
| 5,372,724 | 12/1994 | Ahmed . |
| 5,413,720 | 5/1995 | Miller . |
| 5,458,780 | 10/1995 | Evans . |
| 5,458,789 | 10/1995 | Dickerson et al. . |
| 5,543,058 | 8/1996 | Miller . |
| 5,560,834 * | 10/1996 | Gold . |
| 5,676,829 * | 10/1997 | Cottrill . |

FOREIGN PATENT DOCUMENTS

| | | |
|---|---|---|
| 2901261 | 7/1980 | (DE) . |
| 3212120A1 | 10/1983 | (DE) . |
| 4228096A1 | 3/1994 | (DE) . |
| 4336736 | 5/1995 | (DE) . |
| 0013659 | 7/1980 | (EP) . |
| 0831174A1 | 3/1998 | (EP) . |
| 1098716 | 1/1968 | (GB) . |
| 58-128299 * | 7/1983 | (JP) . |
| 60-36879 * | 8/1985 | (JP) . |

OTHER PUBLICATIONS

"The Smell of Success in Manure", Fertilizer International No. 327, pp. 15–17; Nov. 1993.

Declaration of Matthew B. Hopkins and Robert J. DeRosa signed on May 14, 1997.

"The Komline–Sanderson Gravity Belt Thickener for Sludge/Slurry Volume Reduction. Gravebelt", Product Sheet from Komline–Sanderson of Peapack, New Jersey, Bulletin No. KSB–160–9007, publication date unknown.

"Three Important Reasons To Choose The Klampress", Product Information Sheet from Ashbrook–Simon–Hart, Houston Texas, publication date unknown.

"Belt Filter Press—Dewatering Technology", Product Informtion Sheet from Phoenix Process Equipment Co., Louisville, Kentucky , publication date unknown.

Process Flow Sheet, "WSI Protein Fat Separator", supplemental to the May 15, 1997 Declartion.

* cited by examiner

APPARATUS AND PROCESS FOR SEPARATING COMPONENTS OF A TREATMENT MIXTURE FROM WASTE WATER TREATMENT SYSTEM

RELATED APPLICATIONS

This is a continuation-in-part of application Ser. No. 08/787,792, filed Jan. 23, 1997, (now U.S. Pat. No. 5,980, 754) which is a continuation-in-part of application Ser. No. 09/599,479, filed Jan. 23, 1996, now U.S. Pat. No. 5,658, 462.

BACKGROUND OF THE INVENTION

This invention relates generally to separating components of a mixture that includes liquid and particulate components, and more particularly to apparatus and process for separating and recovering water components, liquified fatty components and particulate protein components of treatment mixtures produced from waste water treatment systems.

Most cities and counties have enacted requirements for industries which discharge water into the municipal sewer systems. These municipalities generally require the waste water to meet certain standards before being discharged into the sewer systems, and these standards usually relate to the level of pollutants which interfere with the efficient operation of the municipal waste water treatment facility.

Waste water which contains materials having a high biochemical oxygen demand, total suspended solids and ammonia increase the treatment cost to the city or county. The term "biochemical oxygen demand" ("BOD") refers to the quantity of oxygen utilized in the biochemical oxidation of organic matter; and the term "total suspended solids" ("TSS") refers to the total suspended solids which float on the surface of, or are suspended in, waste water and which are removable by filtering.

In some instances, a surcharge may be levied on an industrial plant that produces waste water which does not meet the standards as established by the municipality. For example, these standards may prohibit waste water containing greater than 300 mg/liter of BOD, 300 mg/liter of TSS, and/or 18 mg/liter of ammonia. Cities and counties may also prohibit industrial plants from discharging waste water having an oil, grease and fat ("FOG") concentration greater than 150 mg/liter.

A city or county also has the authority to revoke an industrial plant's waste water discharge permit if that plant continues to discharge waste water which does not meet the standards set by that city or county. Therefore, an industrial plant must effectively treat its waste water to reduce the level of pollutants and thereby meet such standards.

An effective waste water treatment process for an industrial plant should cause the solid organic and inorganic matter to flocculate and form a sludge cake. This sludge cake accumulates to a certain thickness and is then separated from the liquid component of the waste water and sent to a rendering plant for further processing. If the resulting sludge cake is under 20%–25% solids, the rendering plant may impose a surcharge because sludge with a high percentage of water is more expensive for the rendering plant to process.

One method of treating waste water from an industrial plant is disclosed in Stewart, U.S. Pat. No. 4,981,599. This process results in the formation of a sludge cake on top of the waste water. The sludge cake is removed, and the treated waste water is discharged into the sewer system.

However, the sludge cake (also referred to as a float material) produced by the Stewart process is not ideally suited for subsequent treatment at a rendering plant because (1) the water content of the float material is higher than desired and (2) the float material is comprised of fatty and protein components which desirably should be separated from the water component.

Conventional apparatus used for separating water components from a sludge cake or other mixtures produced from a waste treatment system typically include a pair of opposing, endless filtering screens constructed of a cloth material made of polypropylene, polyethylene or other similar material. For example, such apparatus are manufactured by Phoenix Process Equipment Company of Louisville, Ky., as Belt Filter Press, model WW-X, and by Ashbrook-Simon-Hartley of Houston, Tex., under the trademark KLAM-PRESS. The filtering screens are driven in the same direction so that treatment mixture deposited between the screens is entrapped between the screens as the mixture is moved through the apparatus. Once the mixture is captured, the screens are conjointly routed through a series of compression rollers that pull the screens toward each other to squeeze the mixture between the screens. Water is thus squeezed from the mixture, leaving a cake-like mixture as an end product.

In co-assigned U.S. patent application Ser. No. 08/787, 792, a novel process is disclosed for separating and recovering water, fatty and protein components of a waste treatment system float material and for providing the protein and fatty components with a high percentage of solids (i.e. a low percentage of water content). The process includes creating a treatment mixture comprising float material and a heated carrier material. The temperature of the mixture is in the range of about 77° C.–99° C. so that the fatty components are generally liquified. The heated mixture is then subjected to a separating process in which the components are separated and recovered from the initial treatment mixture.

While the conventional apparatus discussed above are effective at removing water from a cooled treatment mixture (e.g., in which the fatty components are solidified or at least semi-solidified), there are a number of disadvantages associated with the use of the apparatus. For example, the filtering screens of these apparatus are not constructed to withstand high temperatures, such as temperatures of about 77° C.–99° C. Rather, the mesh of these screens tends to deform when exposed to such temperatures, resulting in poor tracking of the screens through the compression rollers and poor filtering of the mixture.

In addition, the mixtures processed by the conventional apparatus are relatively cooled, such that the fatty components are more solidified. This makes it somewhat more difficult to squeeze water components from the mixture. To compensate, the compression rollers are arranged to apply substantial squeezing pressure to squeeze water from the mixture between the screens. This typically results in particulate components of the mixture being mashed into and entrained in the filtering screens, requiring a substantial amount of cleaning by a washer assembly. For example, conventional apparatus typically use about 40 gallons of cleaning water per minute to clean enmeshed mixture from the belts. The cleaning water becomes contaminated with the waste material cleaned from the belts and must be sent back through the waste treatment system for reprocessing. The excessive use of cleaning water results in substantial reprocessing costs because the charge is typically based on the volume of water which must be treated. Moreover, using two filtering belts and a substantial number of compression rollers also increases the complexity and cost of manufacturing and operating the apparatus.

SUMMARY OF THE INVENTION

Among the several objects and features of the present invention may be noted the provision of apparatus and process for separating components of a treatment mixture from waste water treatment system which processes treatment mixtures having substantially elevated temperatures; the provision of such apparatus and process which reduce entrainment of components in a filtering belt of the apparatus; the provision of such apparatus and process which use less cleaning water to clean the filtering belt; and the provision of such apparatus and process which can operate at efficient processing speeds; the provision of such apparatus and process which are less costly to operate.

Generally, apparatus of the present invention for separating liquid components from a mixture that includes liquid components and particulate components comprises an endless filtering belt having upper and lower reaches and having a mesh size selected to allow liquid components of the mixture to pass therethrough while retaining particulate components thereon. A drive system is operatively connected to the filtering belt for driving movement of the belt in a circuit between upstream and downstream ends of the apparatus so that the upper reach may carry the mixture toward the downstream end. Liquid components are separated from the mixture by filtering through the filtering belt as the belt carries the mixture toward the downstream end of the apparatus. A press is disposed in opposed relation to the upper reach of the filtering belt generally between the upstream and downstream ends of the apparatus to define a nip between the press and the filtering belt. The mixture on the upper reach of the filtering belt passes through the nip as the mixture is carried toward the downstream end of the apparatus. The press applies a squeezing pressure to squeeze the mixture between the press and the filtering belt as the mixture passes through the nip, thereby squeezing liquid components from the mixture for filtering through the belt.

In another embodiment of the present invention, the apparatus comprises an endless filtering belt having a mesh size selected to allow liquid components of the mixture to pass therethrough while retaining particulate components thereon. The belt is constructed of a material capable of maintaining the dimensional stability of the mesh openings of the belt upon exposure to mixture temperatures exceeding about 77° C. A drive system is operatively connected to the filtering belt for driving movement of the belt between the upstream and downstream ends of the apparatus to carry the mixture toward the downstream end. Liquid components are separated from the mixture by filtering through the filtering belt as the belt carries the mixture toward the downstream end of the apparatus.

A process of the present invention for separating components of a mixture including liquid components and particulate components generally comprises feeding the mixture to an endless filtering belt of a separation system. The filtering belt has a mesh size selected to permit liquid components of the mixture to filter down through the belt while retaining particulate components thereon. The belt is moved generally in a circuit between an upstream end of the separation system and a downstream end of the system as liquid components are separated from the mixture by filtering through the filtering belt. Unfiltered mixture carried by the belt is passed through a nip defined by the filtering belt and a press disposed in opposed relation to the filtering belt generally between the upstream and downstream ends of the separation system. The press is capable of applying a squeezing pressure against the mixture to squeeze the mixture between the press and the filtering belt as the mixture passes through the nip to separate liquid components from the mixture for filtering through the belt. The press is permitted to move toward and away from the filtering belt so that the press may be pushed by the mixture away from the filtering belt to allow the mixture to pass through the nip between the press and the filtering belt substantially without particulate components of the mixture being mashed into the filtering belt by the squeezing pressure of the press.

In another embodiment of a process of the present invention for separating components of a mixture including liquid components and particulate components generally, the process comprises feeding the treatment mixture to an endless filtering belt of a separation system. The filtering belt is constructed of a material capable of maintaining the dimensional stability of the mesh openings of the belt upon exposure to mixture temperatures exceeding about 77° C. The belt has a mesh size selected to permit liquid components of the mixture to be separated from the mixture by filtering through the belt while retaining particulate protein components thereon. The belt is moved in a circuit generally between an upstream end of the separation system and a downstream end of the system as liquid components of the mixture filter through the belt. Unfiltered mixture carried by the belt is passed through a nip defined by the filtering belt and a press disposed in opposed relation to the filtering belt generally between the upstream and downstream ends of the separation system. The press is capable of applying a squeezing pressure against the mixture to squeeze the mixture between the press and the filtering belt as the mixture passes through the nip to separate liquid components from the mixture for filtering through the belt.

BRIEF DESCRIPTION OF THE DRAWINGS

FIG. 4a is an enlarged view of a portion of the section of FIG. 4;

FIG. 4b is an enlarged view of another portion of the section of FIG. 4;

Corresponding reference characters indicate corresponding parts throughout the several views of the drawings.

DETAILED DESCRIPTION OF THE PREFERRED EMBODIMENT

For the purposes of this invention, the following definitions are important:

(1) float material—a material obtained from an industrial plant comprising fats, oils and greases ("FOG"); preferably, a material comprising the sludge cake or solid materials which are produced by the waste water treatment system of an industrial plant; most preferably, a material which has been separated from an underlying water phase after first subjecting waste water to an aeration process in a floatation zone in the presence of a flocculent;

(2) protein component—the proteinaceous material recovered from the float material, which typically comprises animal protein but which may also include other types of protein depending upon the nature of the industry from which the float material is obtained;

(3) fatty component—the liquid component which is recovered from the float material and which principally comprises fats, oils and greases;

(4) water component—water recovered from the float material;

(5) carrier material—a liquid which affords the means by which to achieve one or more of the following results: (a) provide heat to a float material, and (b) ensure that the fats, oils and greases which become liquefied as a result of heating remain in a liquid state; and (6) treatment mixture—a mixture comprising the carrier material and the float material.

The treatment mixture is preferably formed by heating the carrier material and then mixing the heated carrier material with the float material. A particularly preferred process for forming the treatment mixture is disclosed in co-pending U.S. patent application Ser. No. 08/787,792. However, it is understood that heating of the carrier material, as well as formation of the treatment mixture, may be carried out using other methods without departing from the scope of this invention. For purposes of describing the present invention, the float material and the heated carrier material are contained in separate sources, such as tanks (not shown), and pumped simultaneously through a common conduit (not shown) by suitable pumps (not shown) so that the treatment mixture is formed while being pumped through the conduit. The treatment mixture typically has a temperature in the range of approximately 77° C.–99° C. so that the fatty components of the mixture are generally liquified.

Figure 1:
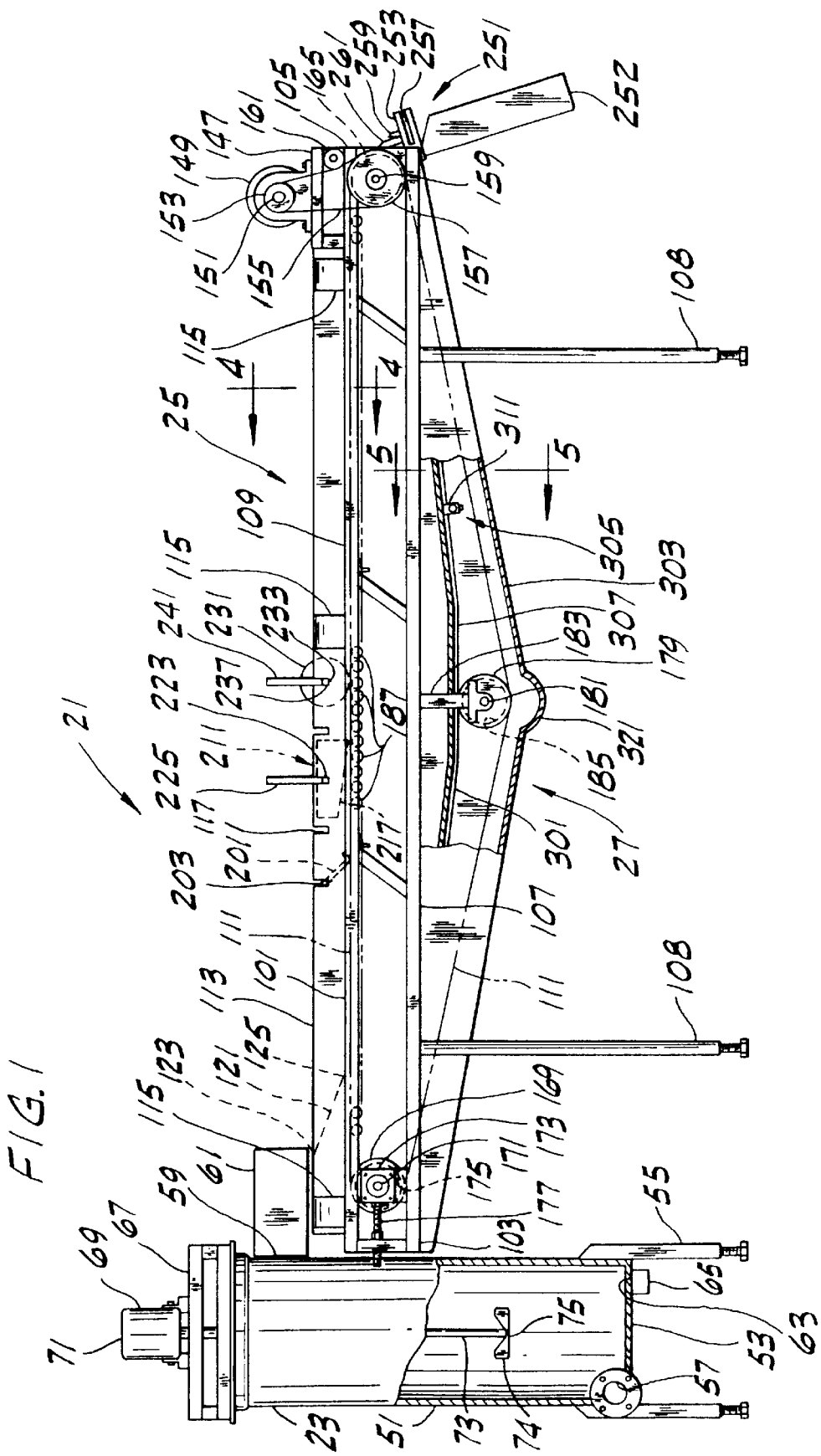
FIG. 1 is an elevation view of apparatus of the present invention for separating components of a treatment mixture produced by a waste treatment system.

Now referring to the drawings, and particularly to FIG. 1, the reference numeral 21 generally indicates an apparatus of this invention for separating and recovering the various components (i.e., the particulate protein components, the liquified fatty components and the water components) of the treatment mixture for further processing. In general, the apparatus 21 comprises a feed tank 23 for receiving treatment mixture from the source of treatment mixture, a separation system, indicated generally at 25, for receiving treatment mixture from the feed tank and separating the various components of the mixture, a fluid recovery system, generally indicated at 27, for recovering water and fatty components separated from the mixture as well as any waste mixture remaining after separation of the mixture components, and a control panel (not shown) for controlling operation of the apparatus.

The feed tank 23 is generally cylindrical, having a side wall 51, a bottom wall 53 and support legs 55 supporting the tank in an upright orientation. An inlet port 57 is disposed in the side wall 51 adjacent the bottom wall 53 in fluid communication with the conduit in which the treatment mixture is formed. The pumps force the treatment mixture through the conduit and into the tank 23 via the inlet port 57. Thus it can be seen that the tank 23 may be located remotely from the treatment mixture source. In the illustrated embodiment, the inlet port 57 is disposed in a generally tangential relationship with the side wall 51 of the tank 23 so that mixture pumped into the tank generates a circumferential swirling of the mixture at the bottom of the tank to inhibit stagnation of the mixture.

An outlet port 59 is disposed in the side wall 51 of the tank 23 substantially adjacent the top of the tank. The treatment mixture fills the tank 23 as it enters through the inlet port 57 and, once the level of the mixture in the tank rises to the height of the outlet port 59, the mixture flows out of the tank via the outlet port. In this manner, treatment mixture continually rises within the tank 23 upward to the outlet port 59 at the top of the tank, thereby inhibiting stagnation of the mixture at the bottom of the tank. However, it is contemplated that feed tanks in which treatment mixture enters the tank 23 other than at its bottom, such as where the mixture enters through the top of the tank, fall within the scope of this invention. A feed tube 61 in fluid communication with the outlet port 59 of the tank directs the mixture to the separation system. A drain opening 63 and associated closure 65 are provided in the bottom wall 53 of the tank 23 for selective draining of the mixture from the tank when cleaning is necessitated.

The top of the tank 23 is open to permit monitoring of and access to the interior of the tank. A frame 67 is mounted on the upper rim of the tank 23 to support a mixture agitator 69 above the open top of the tank. The agitator 69 comprises a motor 71 attached to the frame 67 generally centrally above the open top of the tank 23. A shaft 73 connected to the motor 71 for driven rotation about the rotation axis of the shaft extends down into the tank 23 through the open top of the tank. Blades 74 of a propeller 75 extend radially outward from the bottom of the shaft 73 for conjoint rotation with the shaft. Rotation of the propeller 75 agitates the treatment mixture to further effect the generally circumferential swirling of the mixture so that the mixture spirals upward within the tank 23 to the level of the outlet port 59. The rate of agitation is preferably sufficient to avoid settling of the proteinaceous solids which are present in the treatment mixture, but not so vigorous that shearing of these solids occurs. It is also to be understood that agitators other than the type shown and described herein may be used without departing from the scope of this invention, as long as the agitator is capable of inhibiting settling of the solids without resulting in shearing of the solids.

The separation system 25 is disposed adjacent to the feed tank 23 and is supported by a separator frame 101 with an upstream end 103 of the separation system positioned generally beneath the feed tube 61 for receiving treatment mixture from the feed tank. The separation system 25 is capable of separating the various components of the treatment mixture and carrying the particulate protein components of the mixture to a downstream end 105 of the system. The separator frame 101 includes a pair of longitudinally extending lower rails 107 mounted on support legs 108 and a corresponding pair of upper rails 109 supported in parallel spaced relationship above the lower rails. The separator frame 101 is constructed of stainless steel tubing, preferably square in cross-section and having a cross-sectional dimension of about 1.5 in.×1.5 in. As an example of the overall dimensions of the separator frame 101, the frame of the illustrated embodiment is approximately 11 ft. long and 5 ft.—4 inches wide. It is understood, however, that these dimensions may be altered depending upon mixture processing requirements and remain within the scope of this invention.

Figure 2:
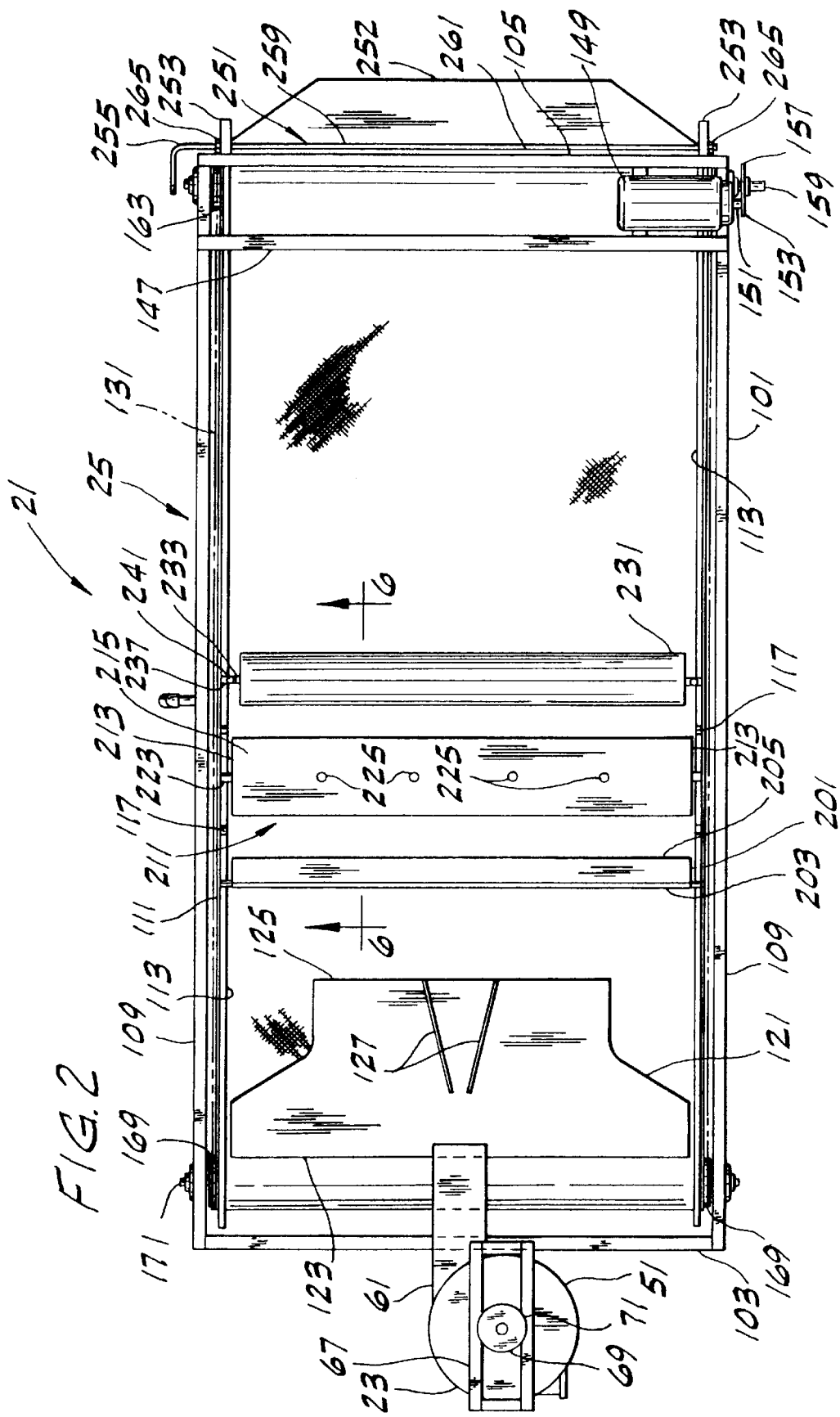
FIG. 2 is a plan of the apparatus of FIG. 1.

With reference to FIGS. 1 and 2, the separation system 25 comprises an endless filtering belt 111 constructed for allowing the water and fatty components of the treatment mixture (e.g, the liquified components of the mixture) to pass through the belt while carrying any unfiltered components toward the downstream end 105 of the separation system. The belt 111 is sufficiently wide to extend transversely generally between the upper rails 109 of the separator frame 101. For example, the belt 111 shown in FIG. 1 is approximately 4 ft.—8 in. wide. The filtering belt 111 is preferably constructed of a stainless steel screen having a mesh size in the range of about 80–150 microns. The stainless steel construction of the belt 111 inhibits deformation of the mesh openings (e.g. stretching of the screen) of the belt when exposed to the heated treatment mixture carried by the belt, and is compatible (e.g., corrosion resistant) with the mixture. It is understood, however, that the filtering belt 111 may be made of materials other than stainless steel, as long the belt maintains dimensional stability of the mesh openings and is substantially corrosion resistant when exposed to the treatment mixture and the high temperatures associated with the mixture (e.g., up to about 99° C.). The mesh size of the belt 111 may vary depending on the size of particulate components to be separated from the mixture and remain within the scope of this invention.

Figure 6:
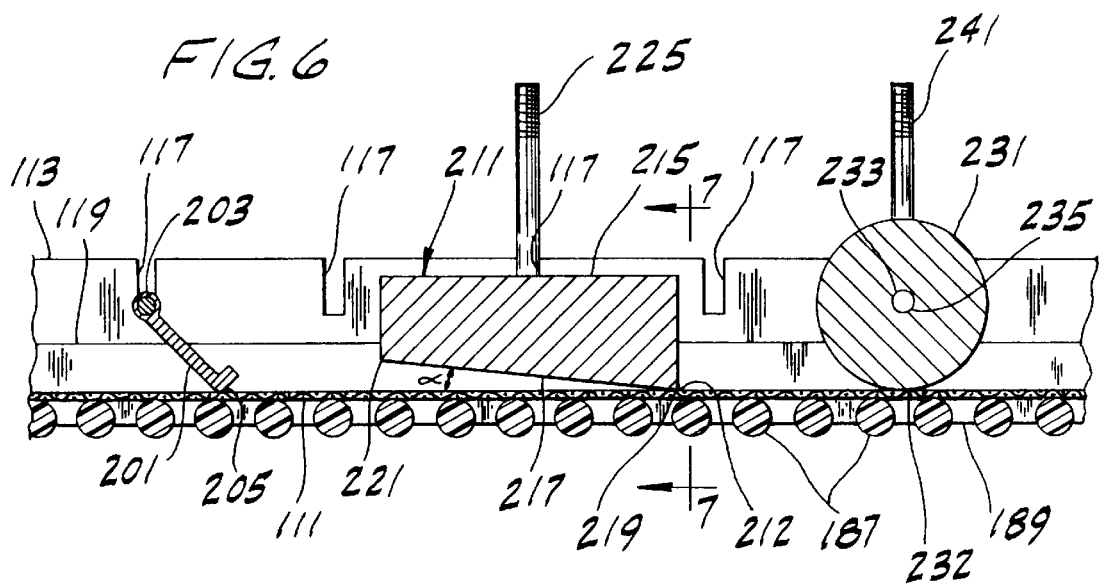
FIG. 6 is a fragmented section taken in the plane of line 6—6 of FIG. 2.

Opposing guide rails 113 extend longitudinally from the upstream end 103 of the separation system to the downstream end 105 in spaced relationship above the filtering belt. As seen best in FIG. 4, the guide rails 113 are disposed inward of the upper rails 109 of the separator frame 101 and are attached to the upper rails by mounting brackets 115 so that a small margin of each side of the belt 111 extends outward beyond the guide rails. Downwardly extending rectangular slots 117 (as shown in FIGS. 1 and 6), the purpose of which will become apparent later herein, are formed in the guide rails 113 at generally equally spaced intervals along the length of the rails. Rubber sealing strips 119 depend from the guide rails 113 along the length of the rails in generally sealing engagement with the filtering belt 111 to inhibit treatment mixture on the belt from spreading transversely outward of the guide rails to the edge margins of the belt. The sealing strips 119 are releasably attached to the guide rails 113, such as by threaded fasteners (not shown) extending through the strips and through vertically oriented slots (not shown) in the guide rails so that the strips can be selectively positioned vertically relative to the guide rails. Thus it can be seen that the strips 119 may be lowered relative to the guide rails 113 as the strips become worn down due to friction between the strips and the filtering belt.

Referring again to FIGS. 1 and 2, a chute 121 extends transversely between the guide rails 113 generally at the upstream end 103 of the separation system 25 for receiving a stream of treatment mixture exhausted from the feed tube 61. The chute 121 is constructed of stainless steel and has an upper end 123 attached to support arms (not shown) extending from the feed tank 23. The chute 123 inclines forward and downward to a lower end 125 disposed slightly above the filtering belt 111 to direct the mixture onto the belt. Tabs (not shown) extending from the sides of the chute 121 are attached to the guide rails 113, such as by welding, to further secure the chute against movement. A pair of fins 127 are mounted on the surface of the chute 121 in spaced relationship with each other, with the lower ends of the fins being flush with the lower end 125 of the chute. The fins 127 angle outward relative to the central axis of the separation system 25 as they extend down the chute 121 so that some of the mixture flowing down the chute is directed laterally outward by the fins to more evenly spread the mixture along the width of the belt 111 upon reaching the lower end 125 of the chute.

Figure 4:
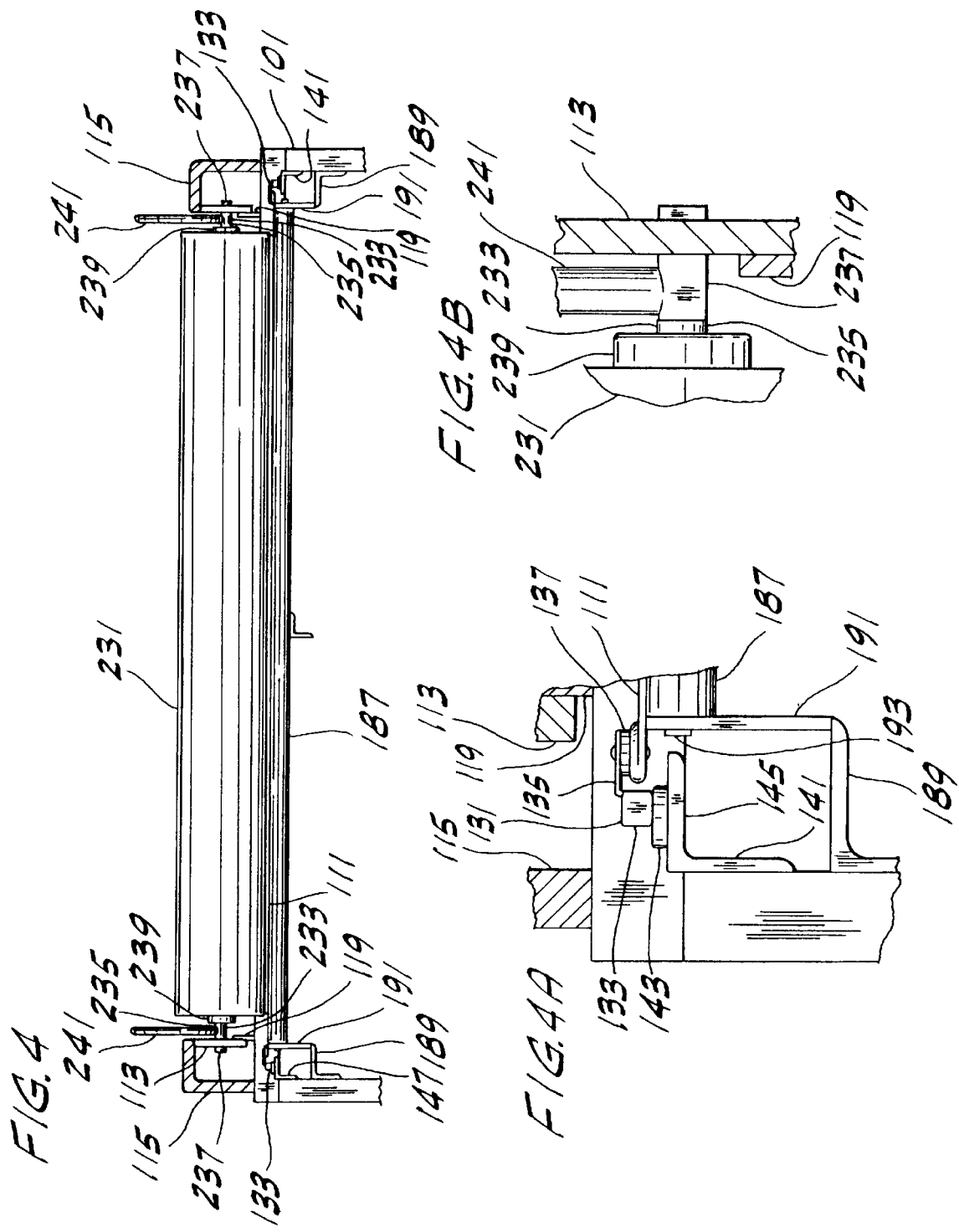
FIG. 4 is a section taken in the plane of line 4—4 of FIG. 1.

A pair of endless chains 131 comprised of interconnected links 133 (FIGS. 4 and 4a) are attached to respective edge margins of the filtering belt 111 for use in driving movement of the belt. A preferred attachment arrangement is disclosed in U.S. Pat. No. 4,081,375 (Deal et al.), which is incorporated herein by reference. Chain extensions 135 are attached to each of the links 133 of the chains 131 and extend inward over the edge margins of the filtering belt 111. An annular spacer 137 is positioned between each extension 135 and the filtering belt 111, and a rivet 139 secures the extension, spacer and belt together so that the chains 131 are secured to the belt. Angle irons 141 (one of which is shown in FIG. 4a) extend longitudinally between the upstream and downstream ends 103, 105 of the separation system 25 and are mounted to the separator frame 101 to define opposing support surfaces for supporting the upper reaches of the chains. Teflon wear strips 143 attached to the support surfaces of the angle irons 141, such as by screw fasteners 145, reduce friction between the chains and the angle irons.

A motor support frame 147 (seen best in FIG. 3) mounted on the upper rails 109 of the separator frame 101 at the downstream end 105 of the separation system 25 supports a motor 149 for driving the chains 131. The motor 149 is connected by way of a drive shaft 151 to a drive gear 153. A drive chain 155 extends downward from the drive gear 153 to a drive sprocket 157 mounted on a shaft 159 extending transversely outward from one side of the separator frame 101 at the downstream end 105 of the separation system 25. The driven shaft 159 further extends between the sides of the separator frame 101 and is journalled in the frame for rotation relative thereto. A chain idler 161 is rotatably connected to the separator frame 101 in contact with the drive chain 155 to maintain tension in the drive chain.

Figure 3:
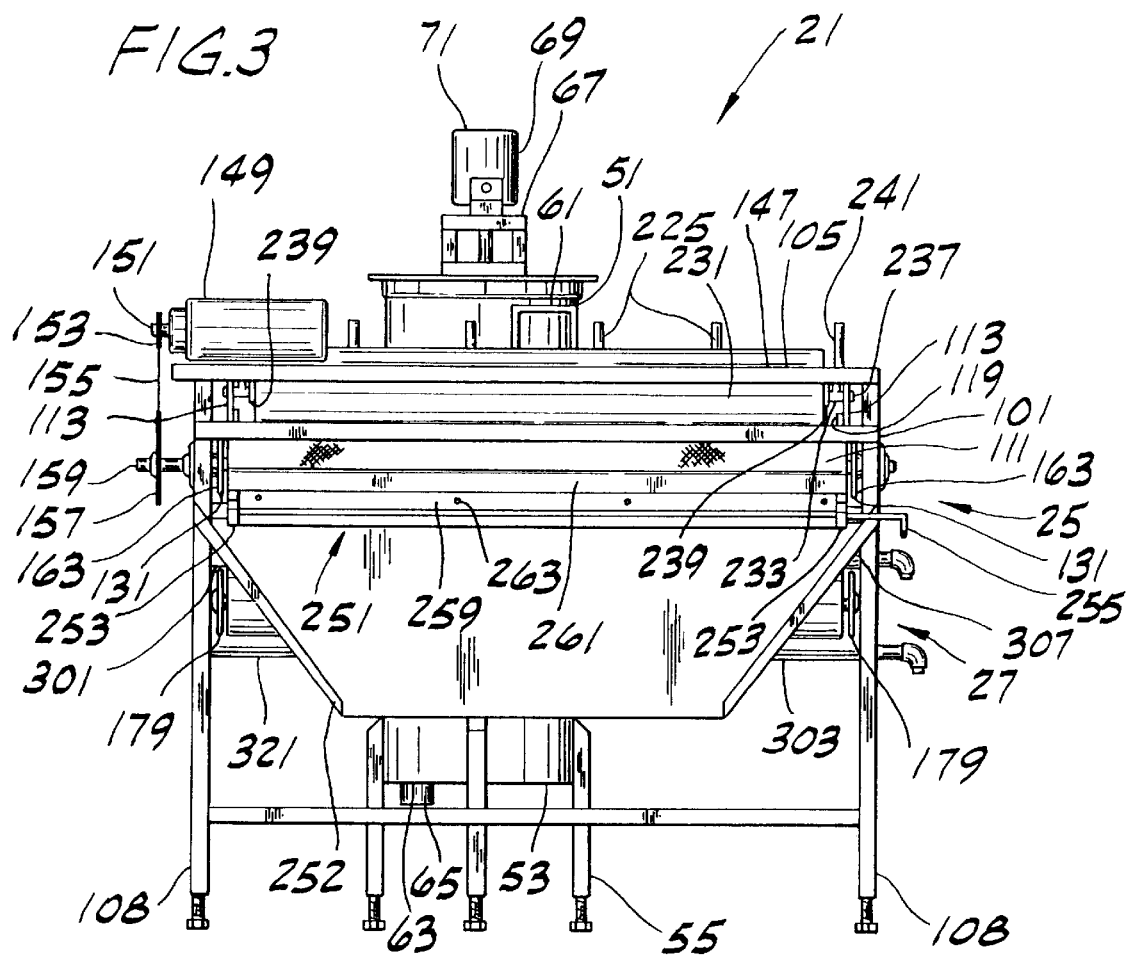
FIG. 3 is an end view of the apparatus of FIG. 1.

As illustrated in FIG. 3, a pair of driven sprockets 163 are mounted on the driven shaft 159 in spaced relationship with each other. The sprockets 163 are positioned between the upper rails 109 of the separator frame 101, with the spacing between the sprockets being slightly greater than the width of the filtering belt 111 so that the sprockets are aligned with the endless chains 131 at the edge margins of the belt. The teeth of the sprockets 163 are sized for meshing with the links 133 of the chains 131 for driving movement of the chains in a conventional manner upon rotation of the sprockets. Thus, it may be seen that the endless chains 131 are driven conjointly by the shaft 159 and sprockets 163 to move the upper reach of the belt 111 toward the downstream end 105 of the separation system 25. A support roller 165 having a length substantially equally to the width of the belt 111 is mounted on the driven shaft 159 for conjoint rotation therewith and extends between the sprockets 163 along substantially the entire width of the filtering belt to support the belt as the endless chains 131 are driven around the sprockets. The roller 165 has a rubber outer surface to maintain sufficient friction between the roller and the filtering belt 111 to inhibit slipping of the belt relative to the roller.

Tension sprockets 169 (FIG. 2) are mounted on another shaft 171 extending transversely between the sides of the separator frame 101 generally at the upstream end 103 of the separation system 25. The shaft 171 is journalled at its ends in mounting brackets 173 for rotation relative to the frame 101. A support roller 175 (shown in phantom in FIG. 1) is also mounted on the shaft 171 between the tension sprockets 169 for conjoint rotation therewith to support the belt 111 as the endless chains 131 are driven around the sprockets. The tension sprockets 169 and shaft 171 are preferably positioned in horizontal alignment with the driven sprockets 163 and shaft 159 so that the upper reach of the belt 111 is supported by the respective support rollers 165, 175 in a relatively horizontal orientation as the belt moves forward between the upstream and downstream ends 103, 105 of the separation system 25.

The mounting brackets 173 supporting the tension shaft 171 are connected to the separator frame 101 by threaded rods 177 (one of which is shown in FIG. 1) extending longitudinally between the brackets and the separator frame. Rotation of the threaded rod 177 relative to the frame 101 causes longitudinal movement of the brackets 173 relative to the frame such that the tension shaft 171 and sprockets 169 are moved longitudinally relative to the driven shaft 159 and sprockets 163. Movement of the tension shaft 171 away from the driven shaft 159 creates additional tension in the belt 111 to maintain the belt generally taut for inhibiting the belt from sagging and also for inhibiting the chains 131 against slipping off of the sprockets 163, 169. Movement toward the driven shaft 159 releases tension to permit removal of the belt 111 for replacement or repair.

Idler sprockets 179 (FIGS. 1 and 3) are mounted on an idler shaft 181 extending transversely between support brackets 183 depending from the lower rails 107 of the separator frame 101 intermediate the driven shaft 159 and the tension shaft 171. The idler shaft 181 is journalled at its ends for rotation relative to the frame 101. The idler sprockets 179 aid in controlling alignment and tracking of the belt 111 (e.g., to inhibit transverse movement of the belt). A support roller 185 is mounted on the idler shaft 181 for conjoint rotation therewith and extends between the idler sprockets 179 along substantially the entire width of the filtering belt 111 to maintain pressure against the belt as the endless chains 131 are driven around the sprockets 179.

In the illustrated embodiment, the endless chains 131, the motor 149 and associated shafts 159, 171, 181, sprockets 163, 169, 179 and rollers 165, 175, 185 broadly define a drive system for driving movement of the filtering belt 111. The motor 149 preferably has sufficient power to drive the filtering belt 111 at speeds over 25 ft./min., up to about 50 ft./min.

Referring particularly to FIGS. 1 and 6, wiper bars 187 extend transversely beneath the upper reach of the filtering belt 111 in close contacting relationship with the belt. Contact between the bars 187 and the belt 111 breaks the surface tension of liquid suspended in the mesh of the upper reach of the belt to help the liquid fluid filter down through the belt. The wiper bars 187 are equally spaced, such as about 1.5 inches apart, substantially the entire distance between the support rollers 165, 175 at the upstream and downstream ends 103, 105 of the separation system 25. Longitudinally extending mounting brackets 189 are fastened to the inner surfaces of the upper rails 109 for supporting the wiper bars 187. As shown in FIG. 4a, the mounting brackets 189 are generally Z-shaped to define vertical mounting sections 191 spaced inward toward each other from the upper rails 109. The wiper bars 187 are preferably constructed of Teflon. The bars 187 of the illustrated embodiment are cylindrical, each having a diameter of about 1 inch. Extensions 193 projecting from the opposite ends of each wiper bar 187 are generally square in cross-section for seating respectively within squared notches (not shown) in the vertical mounting sections 191 of the mounting brackets 189 to secure the bars to the brackets.

A spreader plate 201 is positioned downstream of the lower end 125 of the chute 121 and extends transversely between the guide rails 113 above the belt 111. The spreader plate 201 is generally rectangular and is preferably constructed of stainless steel to withstand exposure to the high temperature of the treatment mixture carried by the filtering belt 111. The top edge of the plate 201 is attached along its length to a rod 203 extending transversely between the guide rails 113. The diameter of the rod 203 is sized for loosely seating within an opposing pair of the downwardly extending slots 117 in the guide rails 113 downstream of the lower end 125 of the chute 121 to secure the spreader plate 201 between the guide rails. A lower edge 205 of the spreader plate 201 rests on the filtering belt 111 and is slightly rounded to reduce the risk of damage to the filtering belt by the lower edge of the spreader plate. The ends of the rod 201 are capable of pivoting movement within the slots 117 of the guide rails 113 so that the rod and attached spreader plate 201 can be conjointly pivoted relative to the separator frame 101 and belt 111 about the rotation axis of the rod. Permitting free rotation of the rod 203 and spreader plate 201 inhibits excessive downward pressure applied by the plate against the filtering belt 111 to reduce wearing of the belt and inhibit excessive squeezing of the mixture against the belt as the mixture passes beneath the spreader plate.

Downstream of the spreader plate 201, a wedging unit, generally indicated at 211, extends transversely between the guide rails 113 in opposed relation with the filtering belt 111 for pressing or squeezing the mixture between the unit and the belt to further remove water and fatty components from the mixture. The wedging unit 211 is located sufficiently downstream of the spreader plate 201 so that water and liquified fatty components have already filtered down through the belt 111 for recovery by the recovery system 27 before the mixture approaches the wedging unit, resulting in a generally cake-like consistency of the mixture.

The wedging unit 211 includes opposing side walls 213, a horizontal top wall 215 and a bottom wall defining an inclined lower surface 217 of the wedging unit. The wedging unit 211 is oriented so that a lower end 219 of the inclined lower surface 217 is downstream of an upper end 221 of the surface and rests on the filtering belt to define a nip 212 between the wedging unit and the belt through which the mixture passes as the mixture is carried downstream by the belt. As an example, the wedging unit 211 illustrated in FIG. 6 is approximately 9 inches long and 4 inches high. The inclination angle $\alpha$ of the inclined lower surface 217 of the wedging unit 211 is preferably in the range of about 10°–300°. The wedge unit 211 of the illustrated embodiment is constructed of steel, with the inclined lower surface 217 of the wedging unit being lined with a rubber material (not shown) to prevent the metal surfaces of the wedging unit from contacting the filtering belt.

Figure 7:
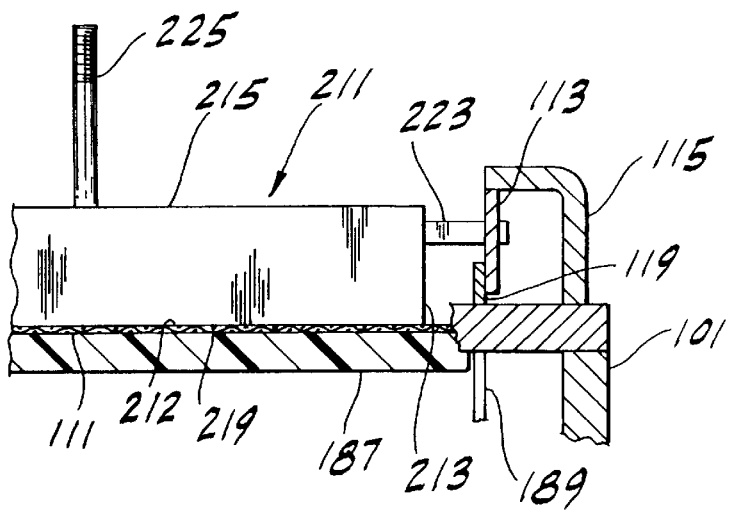
FIG. 7 is a fragmented section taken in the plane of line 7—7 of FIG. 6.

Extension members 223 (seen best in FIG. 7) are attached, such as by welding, to the side walls 213 of the wedging unit 211 and project laterally outward therefrom. The extension members 223 are generally square in cross-section and are sized for seating freely within the vertically extending slots 117 in the guide rails 113 to support the wedging unit 211 at the desired height above the filtering belt 111 and to secure the unit against longitudinal movement relative to the separator frame 101. The extension members 223 are capable of vertical movement within the slots 117, so that the wedging unit 211 can be moved vertically toward and away from the filtering belt 111. As such, the wedging unit 211 "floats" above the filtering belt 111 so that the downward pressure applied by the wedging unit 211 to the mixture is a function of the weight of the wedging unit.

When the mixture moves beneath the wedging unit 211, the mixture engages the inclined lower surface 217 of the wedging unit and is thus inhibited from moving further downstream. It has been found that the wedging unit 211 effectively breaks up the mixture, rolling portions of the mixture back over on itself. This reduces the thickness of the mixture and tends to spread the mixture more evenly along the width of the belt 111. The force of the moving mixture against the inclined lower surface 217 of the wedging unit 211 pushes the wedging unit upward against the weight of the wedging unit so that the mixture can pass through the nip 212 between the lower end 219 of the inclined surface and the filtering belt 111. As the mixture passes through the nip, the weight of the wedging unit 211 exerts a downward or squeezing pressure against the mixture to squeeze the mixture between the wedging unit and the filtering belt 111 to squeeze additional water and fatty components from the mixture for filtering through the belt and to reduce the thickness of the mixture. For example, after passing through the nip 212, the thickness of the mixture is preferably in the range of about 1/16 to 1/2 inches.

The weight of the wedging unit 211 must be such that the squeezing pressure exerted by the wedging unit against the mixture squeezes a desired amount of water and fatty components from the mixture, while still allowing the mixture to move the wedging unit away from the filtering belt so that the mixture can pass through the nip. An excessive downward pressure exerted by the wedging unit 211 would result in the mixture becoming dammed behind the nip 212, and would also result in particulate components of the mixture being mashed by the wedging unit down into the mesh of the filtering belt 111 such that the particulate components undesirably become entrained in the mesh. Vertically extending weight bars 225 are threadably mounted on the top of the wedging unit 211 in transversely spaced relationship between the guide rails 113 for receiving weights (not shown) thereon to adjust (e.g., increase) the downward squeezing pressure applied by the wedging unit to the mixture. The squeezing pressure exerted by the wedging unit 211 of the illustrated embodiment is preferably less than about 30 psi and is more typically about 0.25–1 psi.

Downstream of the wedging unit 211, a press roller 231 extends above the filtering belt 111 transversely across the width of the belt 111 to define a nip 232 between the press roller and the belt. The roller 231 is mounted on an axle 233 (FIGS. 4 and 4a) comprising a cylindrical center portion 235 and generally square end extensions 237. Bearings 239 are positioned on the axle 233 for rotatably mounting the roller 231 on the cylindrical center portion 235 of the axle so that the roller is capable of free rotation about a central longitudinal axis (not shown) of the axle. The end extensions 237 of the axle 233 are sized for seating freely within the vertically extending slots 117 in the guide rails 113, with the roller 231 resting on the filtering belt 111, to secure the roller against longitudinal movement relative to the belt and separator frame 101.

The extensions 237 are capable of vertical movement within the slots 117, so that the roller 231 can be moved vertically toward and away from the filtering belt 111. As such, the roller 231 "floats" above the filtering belt 111 in the same manner as the wedging unit 211 so that downward squeezing pressure applied by the press roller 231 to the mixture is a function of the weight of the press roller. Vertically extending weight bars 241 are attached to the squared end extensions 237 of the axle 233 for receiving weights (not shown) thereon to adjust (e.g., increase) the squeezing pressure applied by the roller against the mixture.

The roller 231 of the illustrated embodiment is preferably 6 inches in diameter so as to minimize the relative approach angle between the roller and the filtering belt 111. It has been found that a smaller relative approach angle inhibits the mixture from sticking to and wrapping around the roller 231 as the mixture passes through the nip between the roller and the belt 111. However, it is understood that the roller 231 may be sized smaller or larger than 6 inches in diameter without departing from the scope of this invention.

Now referring to FIGS. 1 and 3, a scraper unit, generally indicated at 251, extends transversely along the width of the filtering belt 111 at the downstream end 105 of the separation system 25 to scrape the remaining mixture (comprised primarily of the protein components but also including water and fatty components not squeezed from the mixture) off of the belt for delivery to a receptacle (not shown) via a recovery chute 252 positioned adjacent the downstream end 105 of the system. The scraper unit 251 comprises a pair of mounting brackets 253 attached to the separator frame 101 beneath the driven support roller 165 and extending longitudinally outward from the frame. A support rod 255 extends transversely between the brackets 253 and is seated within slots 257 extending longitudinally within the brackets. A mounting plate 259 is attached to the rod 255, such as by welding, to extend generally upward from the rod. A scraper blade 261, preferably constructed of Teflon, is connected to the mounting plate 259 by suitable fasteners 263 in closely spaced relationship with the filtering belt 111 as the belt moves around the driven support roller 165.

The rod 255 is capable of sliding movement within the slots 257 of the mounting brackets 253. In this manner, the angle of the scraper blade 261 relative to the filtering belt 111 can be adjusted by changing the position of the rod 255 within the slots 257 of the brackets 253. Suitable end nuts 265 releasably fix the rod 255 in its desired position. In the illustrated embodiment of FIG. 2, the rod 255 is bent at one end to a 90° angle to extend longitudinally inward of the scraper blade 261 for receiving weights thereon. It will be seen that weights may be loaded onto the bent end of the rod 255 to apply a torque to the scraper unit 251 to better hold the scraper blade 261 against the filtering belt 111.

The separation system 25 shown in the various figures herein includes a single wedging unit 211 disposed upstream of a single press roller 231. However, it is understood that the press roller 231 may be located upstream of the wedging unit 211 and remain within the scope of this invention. It has also been discovered that it is easier to squeeze water from the treatment mixture when the mixture is relatively thin as it passes beneath the wedging unit 211 and/or press roller 231. Where additional separation of water components is desired, it is contemplated that multiple wedging units 213 may be used, with the downward pressure exerted by the wedging units progressively increasing from the furthest upstream unit to the furthest downstream unit. Each of the wedging units 213 would be secured in a respective pair of the slots 117 in the guide rails 113. Multiple press rollers 231 may also be used in a manner similar to the multiple wedging units 211.

Also, for purposes herein, the wedging unit 211 and press roller 231 broadly comprise a press for applying a squeezing pressure to the mixture for squeezing the mixture against the filtering belt. It is contemplated, however, that the press may also comprise a single wedging unit by itself, a single press roller by itself, multiple wedging units, multiple roller units, or any combination of wedging units and roller units. The wedging unit 211 and press roller 231 are show and described herein as resting on the filtering belt when no mixture is passing through the nips 212, 232. However, it is contemplated that the wedging unit 211 and press roller 231 may be mounted on the guide rails 113 such that the roller and the lower end 219 of the inclined surface 217 of the wedge unit are spaced an initial distance from the filtering belt, such as about 1/16–1/2 inches, without departing from the scope of this invention.

In addition, the weights added to the wedging unit 211 and press roller 231 broadly comprise a biasing member for increasing the squeezing pressure applied by the press to the mixture as the mixture passes through the nips 212, 232. It is contemplated that biasing members other than weights may be used to increase the squeezing pressure applied by the wedging unit 211 and press roller 231 to the mixture, such as springs (not shown) that are sufficiently tensioned to inhibit the wedging unit and press roller against being pushed upward by the mixture, and remain within the scope of this invention.

Referring again to FIG. 1, the recovery system comprises upper and lower drain pans, respectively designated as 301 and 303, and a belt washer assembly, generally indicated at 305. The upper drain pan 301 extends longitudinally between the upstream and downstream ends 103, 105 of the separation system 25 and is attached to the lower rails 107 of the separator frame 101 beneath the upper reach of the filtering belt 111 for recovering substantially all of the water and fatty components passing through the upper reach of the filtering belt. The upper drain pan 301 is generally V-shaped so that liquid components recovered by the drain pan flow toward a central collection channel 307 extending transversely along the bottom of the drain pan. A suitable pipe (not shown) in fluid communication with the collection channel 307 receives the liquid components from the channel and carries the components to a clarifying station (not shown) where the recovered water and fatty components of the mixture may be separated in a conventional manner.

Figure 5:
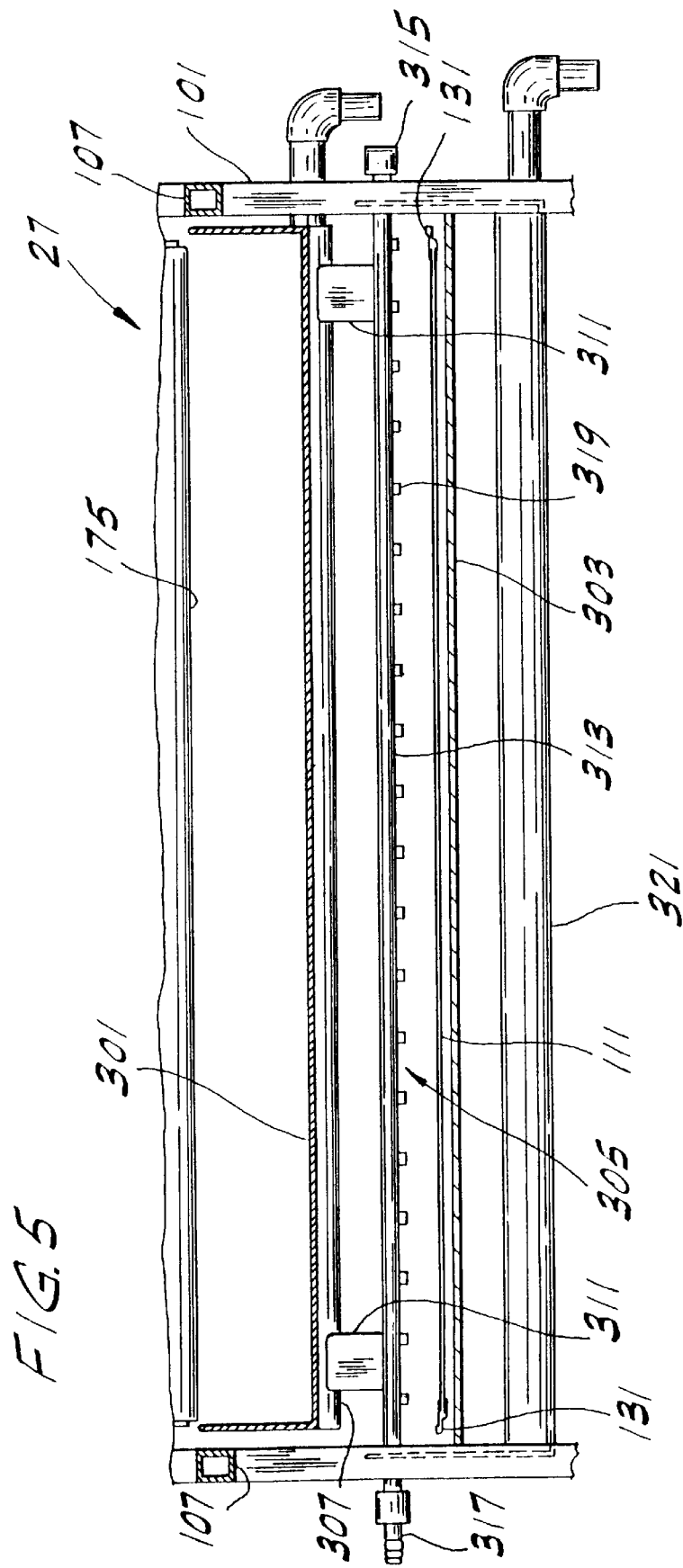
FIG. 5 is a section taken in the plane of line 5—5 of FIG. 1.

As shown in FIG. 5, the belt washer assembly 305 is secured by support brackets 311 connected to and depending from the bottom of the upper drain pan 301 for washing the lower reach of the filtering belt 111 as it returns from the downstream end 105 of the separation system 25 back to the upstream end 103. The washer assembly 305 includes a transversely extending pipe 313 having a length greater than the width of the filtering belt 111. One end of the pipe 313 is fitted with an end cap 315 while the other end is fitted with a nipple 317. The nipple 317 is adapted for connection, such as by suitable hosing (not shown) to a source of cleaning water (not shown). Spray nozzles 319 are fitted within openings (not shown) equally spaced along the length of the pipe 313 to direct pressurized water down against the lower reach of the filtering belt 111. The pressure of the water is preferably sufficient to dislodge any protein, water and fatty components lodged in the mesh of the filtering belt 111.

The lower drain pan 303 is attached to the separator frame 101 beneath the lower reach of the filtering belt 111 for recovering cleaning water from the washer assembly 305 along with any mixture components washed from the filtering belt. As with the upper drain pan 301, the lower drain pan 303 is generally V-shaped so that the components recovered by the drain pan flows toward a central collection channel 321 extending transversely across the bottom of the drain pan. A suitable pipe (not shown) in fluid communication with the collection channel 321 receives the mixture of components from the channel and carries the mixture to the waste treatment station for reprocessing and further separation of the components.

Operation of the apparatus 21 of the present invention will now be described. Before activating the apparatus 21, the spreader plate 201, wedging unit 211 and press roller 231 are secured on the longitudinally extending guide rails 113 of the separator frame 101 at the desired positions between the upstream and downstream ends 103, 105 of the separation system 25 in the manner described above. Weights may be placed on the vertically extending weight bars 225, 241 of the wedging unit 211 and press roller 231 to adjust the downward pressure to be applied by the wedging unit and press roller against the mixture being processed. The conduit carrying the treatment mixture is connected to inlet port 57 of the feed tank 23. The treatment mixture in the conduit is at a temperature in the range of about 77° C.–99° C. so that the fatty components of the mixture are generally liquified.

The control panel is then used to activate the apparatus 21, turning on the filtering belt motor 149, the agitator motor 71 and the pumps associated with the treatment mixture. The filtering belt motor 149 drives rotation of the drive gear 153, thereby driving rotation of the drive sprocket 157 via the drive chain 155. The driven shaft 159 is rotated by the drive sprocket to drive rotation of the driven sprockets 163 about the rotation axis of the shaft. The teeth of the sprockets 163 mesh with the links 133 of the endless chains 131 attached to the filtering belt 111 to move the chains around the sprockets. The chains 131 are continuously driven by the motor 149 to drive the attached filtering belt 111 so that the upper reach of the belt moves continuously from the upstream end 103 of the separation system 25 to the downstream end 105.

The pumps associated with the treatment mixture pump the heated mixture through the conduit leading to the feed tank 23. The treatment mixture enters the feed tank 23 through the inlet port 57 adjacent the bottom wall 53 of the tank. The level of the treatment mixture within the tank 23 continues to rise as the mixture is pumped into the bottom of the tank. Pumping the mixture into the bottom of the tank tangential to the tank side wall 51 imparts a continuous upward swirling movement to the mixture already in the tank to inhibit stagnation of the mixture at the bottom of the tank. The agitator motor 71 drives rotation of the shaft 73 and propeller 75 so that once the level of the mixture reaches the propeller, the mixture is agitated by the propeller. Agitation of the treatment mixture inhibits settling of the solids present in the mixture and promotes the swirling or spiraling motion of the mixture as it rises within the tank 23.

When the feed tank 23 fills to the level of the outlet port 59, treatment mixture flows from the feed tank 23 via the outlet port and is carried by the feed tube 61 to the upstream end 103 of the separation system 25. Treatment mixture flows from the feed tube 61 down onto the chute 121 above the filtering belt 111. As the mixture flows forward and downward on the chute 121, the fins 127 on the chute spread the mixture outward so that the mixture is distributed more evenly along the width of the belt upon reaching the lower end 125 of the chute.

Treatment mixture on the chute 121 flows down onto the moving filtering belt 111 and is carried by the belt toward the downstream end 105 of the separation system 25. The liquified components (i.e., the water and fatty components) of the mixture begin filtering down through the belt 111 and are recovered in the upper drain pan 301 beneath the belt for delivery to the clarifier. The wiper bars 187 in contact with the underside of the filtering belt 111 break the surface tension of liquid components in the mesh of the belt to promote passing of these components down through the belt to the upper drain pan 301. As mixture approaches the spreader plate 201 downstream of the chute 121, the plate is lifted by the mixture so that the mixture can pass downstream of the plate. Some of the mixture begins to dam behind the plate 201 and tends to move laterally along the width of the belt 111 to areas where the mixture is less thick, thereby more uniformly distributing the mixture along the width of the belt.

When the mixture reaches the wedging unit 211 downstream of the spreader plate 201, a sufficient amount of liquid components have been filtered out of the mixture so that the remaining protein and liquid components have a cake-like consistency. The inclined lower surface 217 of the wedging unit 211 resists forward movement of the mixture and acts to compact or squeeze the mixture against the filtering belt 111. More particularly, the inclined surface 217 pushes portions of the mixture backward, such that the mixture tends to churn, or roll backward onto additional incoming mixture. The churning or agitating action tends to work additional water and fatty components from the mixture for filtering through the belt 111, and also promotes tumbling of the mixture to areas of less thickness, thereby spreading the mixture more uniformly along the width of the filtering belt for further processing of the mixture.

As the mixture engages the inclined lower surface 217 of the wedging unit 211, the force of the forward moving mixture against the inclined surface increases. The floating arrangement of the wedging unit 211 allows the wedging unit to be lifted by the mixture away from the filtering belt so that the mixture can pass through the nip 212. The squeezing pressure exerted by the wedging unit 211 resists the upward lifting by the mixture and squeezes the mixture between the lower end 219 of the inclined surface 217 and the filtering belt 111 to promote the further squeezing of water and fatty components from the mixture for filtering through the belt 111.

The mixture is then carried further downstream by the filtering belt 111 to the press roller 231 where the mixture is further squeezed to remove additional water and fatty components. As with the wedging unit 211, when the mixture engages the press roller 231, an upward pressure is applied by the mixture to the roller. The floating arrangement of the press roller 231 allows it to be lifted by the mixture so that the mixture can pass through the nip 232 and be carried further downstream by the belt 111. The squeezing pressure exerted by the press roller 231 squeezes the mixture between the roller and the filtering belt 111.

Upon reaching the downstream end 105 of the separation system 25, mixture remaining on the filtering belt 111 engages the scraper blade 261 as the belt and chains 131 move around the driven sprockets 163 and associated support roller 165. The scraper blade 261 removes the mixture from the belt so that the mixture falls onto the recovery chute 252 for delivery into the receptacle. Any components adhering to or remaining enmeshed in the belt 111 after scraping are carried by the lower reach of the belt beneath the washer assembly 305 above the lower drain pan 303. The remaining components are washed from the filtering belt 111 and recovered by the lower drain pan 202 for delivery back to the waste treatment system to be reprocessed.

It will be observed from the foregoing that the apparatus 21 and process described herein satisfies the various objectives of the present invention and attains other advantageous results. Constructing the filtering belt 111 of stainless steel inhibits the belt from deforming due to the high temperatures (e.g., in the range of 77° C.–99° C.) of the treatment mixture. Thus, the apparatus 21 is capable of processing a heated treatment mixture in which the fatty components of the mixture are generally liquified.

Importantly, mounting the wedging unit 211 and press roller 231 on the guide rails 113 for floating movement toward and away from the filtering belt prevents excessive squeezing pressure from being applied to the mixture so that particulate components of the mixture are not mashed into and entrained in the mesh of the filtering belt 111. As such, the belt 111 requires little cleaning after the mixture has been scraped off at the downstream end 105 of the separation system 25. More particularly, it has been found that the amount of cleaning water used by the washer assembly 305 to sufficiently clean the filtering belt 111 may be less than or equal to about 10 gallons per minute. Moreover, the filtering belt is cleaned intermittently or on an as needed basis, so that the 10 gallons per minute rate of cleaning water usage occurs for only about 1–5 minutes per hour. This is a substantial reduction in water usage over the 40 gallons per minute, continuous usage associated with conventional separating apparatus to process a similar volume of mixture. Since the cleaning water must be recovered and sent back to the waste treatment system for reprocessing, the reduction in cleaning water usage directly results in a reduction of processing costs.

Also, because the fatty components are generally liquified, a substantial amount of water and fatty components are separated from the mixture prior to squeezing of the mixture by the wedging unit 211 and press roller 231. In addition, less pressure is needed by the wedging unit 211 and press roller 231 to squeeze additional water and fatty components from the mixture. However, even without applying substantial squeezing pressure to the mixture, it has been found that at least about 30% of the water components of the initial treatment mixture can be separated from the mixture by the present apparatus. Thus, only a single filtering belt 111 is needed (as opposed to the twin belts employed by conventional apparatus) along with the longitudinally stationed wedging unit 231 and press roller 231 to adequately separate the water and fatty components from the mixture. A large number of compression rollers, as well as the complicated compression roller pattern, is no longer required, resulting in a reduced cost to manufacture and maintain the apparatus 21.

The less complicated design of the apparatus 21 and the ability of the filtering belt 111 to maintain dimensional stability of the belt mesh upon exposure to the high temperatures of the treatment mixture also allow the filtering belt to be driven at higher speeds, such as about 25 ft/min. or more, and particularly up to about 50–60 ft/min. This results in greater processing capabilities.

While the above apparatus and process are described herein in relation to the separation of water and liquified fatty components from a treatment mixture that also includes proteinaceous solids, it is to be understood that the apparatus and process may be used for processing any mixture comprised of liquid components and particulate components and remain within the scope of this invention.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for separating liquid components from a mixture that includes liquid components and particulate components, the apparatus having an upstream end adapted for receiving the mixture and a downstream end, said apparatus comprising:

an endless filtering belt having upper and lower reaches and having a mesh size selected to allow liquid components of the mixture to pass therethrough while retaining particulate components thereon;

a drive system operatively connected to the filtering belt for driving movement of the belt in a circuit between the upstream and downstream ends of the apparatus so that the upper reach may carry the mixture toward the downstream end, whereby liquid components are separated from the mixture by filtering through the filtering belt as the belt carries the mixture toward the downstream end of the apparatus; and a press mounted on the apparatus in opposed, permanently spaced relationship with the upper reach of the filtering belt generally between the upstream and downstream ends of the apparatus to define a nip between the press and the filtering belt, the mixture on the upper reach of the filtering belt passing through the nip as the mixture is carried toward the downstream end of the apparatus, said press comprising a wedging unit having an inclined lower surface in opposed relationship with the filtering belt, the inclined lower surface having an upper end and a lower end downstream of the upper end, the lower end being substantially closer to the belt than the upper end and defining the nip, the inclined lower surface of the wedging unit applying a squeezing pressure against mixture contacting the lower surface as the mixture passes the wedging unit, the inclined lower surface agitating at least some of the mixture upstream of the lower end of the lower surface to work additional liquid components from the mixture before the mixture is carried downstream of the wedging unit and to promote uniform distribution of the mixture along the width of the filtering belt.

2. Apparatus as set forth in claim 1 wherein said press is mounted on the apparatus for movement toward and away from the filtering belt as the treatment mixture passes through the nip, the press being adapted to be pushed away from the filtering belt by the treatment mixture as the mixture is carried through the nip to inhibit damming of the mixture upstream of the press and to inhibit particulate components of the mixture from becoming entrained in the mesh of the filtering belt, the press being mounted on the apparatus relative to the belt such that the inclination of the lower surface of the wedging unit relative to the belt remains substantially constant as the mixture passes through the nip and the press moves relative to the belt.

3. Apparatus as set forth in claim 2 wherein the press includes a biasing member adapted for applying a selected squeezing pressure against the treatment mixture as the mixture passes through the nip between the press and the filtering belt.

4. Apparatus as set forth in claim 3 wherein the biasing member comprises a weight mounted on the press to increase the weight of the press.

5. Apparatus as set forth in claim 1 wherein said wedging unit is a first wedging unit and is capable of exerting a first predetermined squeezing pressure against the mixture, said press further comprising a second wedging unit disposed downstream of the first wedging unit and being capable of exerting a second predetermined squeezing pressure greater than the first squeezing pressure.

6. Apparatus as set forth in claim 1 wherein the inclined lower surface of the wedging unit has an angle of inclination relative to the filtering belt in the range of about 10°–30°.

7. Apparatus as set forth in claim 1 wherein the wedging unit is mounted on the apparatus for movement toward and away from the filtering belt as the mixture passes through the nip between the wedging unit and filtering belt.

8. Apparatus as set forth in claim 7 wherein the squeezing pressure exerted by the wedging unit against the mixture is sufficiently small such that the wedging unit is capable of being pushed away from the filtering belt by the mixture as the mixture passes through the nip to inhibit damming of the mixture upstream of the lower end of the inclined lower surface of the wedging unit and to inhibit particulate components of the mixture from being mashed into the belt and becoming entrained in the mesh of the filtering belt.

9. Apparatus as set forth in claim 8 wherein the squeezing pressure exerted by the wedging unit against the mixture is in the range of about 0.25 psi–30 psi.

10. Apparatus as set forth in claim 9 wherein the squeezing pressure is in the range of about 0.25 psi–5 psi.

11. Apparatus for separating liquid components from a mixture that includes liquid components and particulate components, the apparatus having an upstream end adapted for receiving the mixture and a downstream end, said apparatus comprising:

an endless filtering belt having upper and lower reaches and having a mesh size selected to allow liquid components of the mixture to pass therethrough while retaining particulate components thereon;

a drive system operatively connected to the filtering belt for driving movement of the belt in a circuit between the upstream and downstream ends of the apparatus so that the upper reach may carry the mixture toward the downstream end, whereby liquid components are separated from the mixture by filtering through the filtering belt as the belt carries the mixture toward the downstream end of the apparatus; and a press disposed in opposed relation to the upper reach of the filtering belt generally between the upstream and downstream ends of the apparatus to define a nip between the press and the filtering belt, the mixture on the upper reach of the filtering belt passing through the nip as the mixture is carried toward the downstream end of the apparatus, said press applying a squeezing pressure to squeeze the mixture between the press and the filtering belt as the mixture passes the press, thereby squeezing liquid components from the mixture for filtering through the belt;

said press comprising a wedging unit having an inclined lower surface in opposed relationship with the filtering belt, the inclined lower surface having an upper end and a lower end downstream of the upper end, the lower end being substantially closer to the belt than the upper end and defining the nip, the inclined lower surface of the wedging unit applying a squeezing pressure against the mixture as the mixture passes the wedging unit, the inclined lower surface agitating at least some of the mixture upstream of the lower end of the surface to work additional liquid components from the mixture before the mixture is carried downstream of the wedging unit and to promote uniform distribution of the mixture along the width of the filtering belt;

said press further comprising a press roller spaced from the wedging unit and disposed in opposed relation to the filtering belt to define a nip between the press roller and the belt, the press roller applying a downward pressure against the mixture to squeeze the mixture between the roller and the belt as the mixture is carried past the press roller for squeezing additional liquid components from the mixture for filtering through the belt.

12. Apparatus for separating liquid components from a mixture that includes liquid components and particulate components, the apparatus having an upstream end adapted for receiving the mixture and a downstream end, said apparatus comprising:

an endless filtering belt having upper and lower reaches and having a mesh size selected to allow liquid components of the mixture to pass therethrough while retaining particulate components thereon;

a drive system operatively connected to the filtering belt for driving movement of the belt in a circuit between the upstream and downstream ends of the apparatus so that the upper reach may carry the mixture toward the downstream end, whereby liquid components are separated from the mixture by filtering through the filtering belt as the belt carries the mixture toward the downstream end of the apparatus; and a feed tank for delivering mixture to the filtering belt, the feed tank having an inlet port for receiving mixture pumped from a source of mixture into the tank and an outlet port for dispensing mixture from the tank and onto the filtering belt, the inlet port being disposed generally adjacent the bottom of the tank, the outlet port being disposed substantially higher than the inlet port so that mixture pumped into the tank through the inlet port adjacent the bottom of the tank generally rises from the bottom of the tank to the level of the outlet port before being dispensed from the tank via the outlet port, the tank having a generally cylindrical side wall, the inlet port being disposed in the side wall in generally tangential relationship therewith whereby mixture is pumped into the tank through the inlet port in tangential relationship with the side wall to effect a generally vortical swirling of the mixture in the tank for inhibiting settling of the particulate components at the bottom of the tank.

13. Apparatus as set forth in claim 12 further comprising an agitator mounted on the tank and extending into the interior of the tank for agitating the mixture as it rises within the tank to inhibit settling of the particulate components of the mixture.

14. Apparatus as set forth in claim 13 wherein the agitator comprises a motor mounted on the tank generally at the top of the tank, a shaft operatively connected to the motor for rotation about a rotation axis of the shaft, the shaft extending down into the interior of the tank generally along a central longitudinal axis of the tank side wall, and a propeller attached to the shaft within the interior of the tank for conjoint with the shaft about the rotation axis of the shaft, rotation of the propeller thereby facilitating a generally vortical swirling of the mixture as the mixture rises within the tank.

15. Apparatus as set forth in claim 14 wherein the motor of the agitator drives rotation of the propeller at a rate sufficient to inhibit settling of the particulate components of the mixture without causing shearing of the particulate components.

16. Apparatus as set forth in claim 12 further comprising an inclined chute generally disposed downstream of the outlet port of the feed tank for delivering mixture dispensed from the outlet port to the filtering belt, the chute sloping down away from the outlet port to the filtering belt, said chute having fins attached to the upper surface of the chute for spreading mixture along the width of the chute to distribute the mixture generally along the width of the filtering belt upon reaching the end of the chute.

* * * * *